(12) United States Patent
Brunone (10) Patent No.: US 12,065,322 B2
(45) Date of Patent: Aug. 20, 2024

(54) DIVIDED MATERIAL CONVEYING SYSTEM AND ASSOCIATED METHOD

(71) Applicant: René Brunone, Saint-Marcel (FR)

(72) Inventor: René Brunone, Saint-Marcel (FR)

(73) Assignee: René Brunone, Saint-Marcel (FR)

( * ) Notice: Subject to any disclaimer, the term of this patent is extended or adjusted under 35 U.S.C. 154(b) by 57 days.

(21) Appl. No.: 17/657,100

(22) Filed: Mar. 29, 2022

(65) Prior Publication Data

US 2022/0306408 A1     Sep. 29, 2022

(30) Foreign Application Priority Data

Mar. 29, 2021 (FR) .................... 21 03195

(51) Int. Cl.
*B65G 65/42* (2006.01)
*B65G 19/04* (2006.01)
*B65G 39/10* (2006.01)
*B65G 41/02* (2006.01)

(52) U.S. Cl.
CPC ............ *B65G 65/42* (2013.01); *B65G 19/04* (2013.01); *B65G 39/10* (2013.01); *B65G 41/02* (2013.01); *B65G 2201/045* (2013.01)

(58) Field of Classification Search
CPC ........ B65G 41/02; B65G 39/10; B65G 19/04; B65G 65/42
See application file for complete search history.

(56) References Cited

U.S. PATENT DOCUMENTS

| | | |
|---|---|---|
| 2,278,730 A | 4/1942 | Neuman |
| 2,568,434 A | 9/1951 | Dunasky |
| 3,889,826 A | 6/1975 | Pate |
| 4,042,129 A * | 8/1977 | Hampton ............... B65G 65/06 198/550.8 |
| 4,248,337 A | 2/1981 | Zimmer |
| 2014/0044507 A1 * | 2/2014 | Naizer ................... G01G 11/12 700/231 |

FOREIGN PATENT DOCUMENTS

| | | |
|---|---|---|
| DE | 1135373 B | 8/1962 |
| DE | 1185543 B | 1/1965 |
| EP | 2644539 A1 | 10/2013 |
| FR | 2027330 A1 | 9/1970 |
| FR | 2348132 A1 | 11/1977 |
| FR | 2493284 A1 | 5/1982 |
| JP | S52-27079 U | 2/1977 |

OTHER PUBLICATIONS

French Search Report for French Patent Application No. FR2103195, dated Dec. 2, 2021 in 2 pages.

* cited by examiner

*Primary Examiner* — Saul Rodriguez
*Assistant Examiner* — Willie W Berry, Jr.
(74) *Attorney, Agent, or Firm* — Knobbe, Martens, Olson & Bear, LLP (57) ABSTRACT

A conveying system for conveying a divided material forming a pile includes a trench extending in a main direction. The trench is under a reception location of the pile along an direction of elevation. The conveying system also includes a conveyor extending along a route, which includes at least one reception portion extending into the trench. The conveying system further includes a number of protectors extending across the trench above the reception portion in the direction of elevation, and a carriage adapted to move along the trench and including a first actuator adapted to successively move each protector in the main direction.

14 Claims, 6 Drawing Sheets

DIVIDED MATERIAL CONVEYING SYSTEM AND ASSOCIATED METHOD

CROSS-REFERENCE TO RELATED APPLICATION

This application claims priority to French Patent Application No. 21 03195 filed on Mar. 29, 2021, the disclosure of which including the specification, the drawings, and the claims is hereby incorporated by reference in its entirety.

FIELD OF THE INVENTION

The present invention relates to a conveying system for conveying divided material forming a pile, the conveying system comprising:
 a trench extending along a main direction, under a reception location of the pile along a direction of elevation; and
 a conveyor extending along a route, the route comprising at least one reception portion extending into the trench.

The invention also relates to a conveying method that implements said system.

BACKGROUND OF THE INVENTION

Conveyor belts are an efficient solution for transporting large quantities of divided materials such as rubble, sand, or salt. They effectively make energy-efficient transport over long distances possible, in a continuous manner. These divided materials are stored in the vicinity of their extraction or production site, then transported away for processing and distribution.

Divided materials are typically stored in piles, either in the open air or in warehouses, which is a particularly simple, convenient, and inexpensive storage method as compared to hopper or silo systems.

These belt conveying systems can still be improved.

Indeed, the divided material of the pile passing to the conveyor belt requires human intervention, equipped with transport machines, which is not very ergonomic and rather expensive for large quantities of conveyed material.

SUMMARY OF THE INVENTION

An object of the invention is therefore to provide a transport system that makes a simple and efficient passage of the divided material to the conveyor belt possible, requiring little external intervention.

To this end, it is an object of the invention to provide a conveying system of the aforementioned type further comprising:
 a plurality of protectors extending across the trench, above the reception portion along the direction of elevation; and
 a carriage adapted to move along the trench and comprising a first actuator adapted to move each protector successively in translation in the main direction.

According to particular embodiments, the conveying system according to the invention has one or more of the following features, taken alone or in any technically feasible combination:
 each protector comprises:
  a substantially rectangular horizontal plate extending across the trench, and
  a vertical plate attached to the horizontal plate, projecting perpendicularly from the horizontal plate along the direction of elevation;
 the first actuator comprises a roller and a counter-roller, rotatable about respective axes of rotation parallel to the direction of elevation, the first actuator also comprising a motor arranged to rotate at least the roller, the roller and the counter-roller being arranged to come into contact with two opposite faces of the vertical plate and to move the protector in in translation in the main direction;
 the carriage comprises a second actuator comprising a second roller and a second counter-roller, as well as a motor rotating at least the second roller, the second roller and the second counter-roller being arranged to come into contact with two opposite faces of the vertical plate and to move the carriage in translation in the main direction;
 the carriage comprises side plates, extending opposite the rollers and the counter-rollers, intended to protect the rollers from the divided material;
 the carriage comprises at least one scraping device, extending in a transverse direction orthogonal to the main direction, each scraping device comprising at least one brush mounted on a chain, movable in the transverse direction, so as to move the divided material from the pile towards the trench in the transverse direction;
 the trench defines substantially parallel side edges, the conveying system comprising supports projecting from the side edges of the trench and supporting the protectors;
 the supports are substantially cylindrical and have a substantially circular cross-section in a plane parallel to the main direction and the direction of elevation; and
 the conveyor comprises a conveyor belt, extending substantially parallel to the main direction and forming an outbound strand, extending into the reception portion and a return strand.

The invention also relates to a method for conveying a divided material, the method comprising the following steps:
 providing a conveying system, as previously described, and a pile formed by the divided material on the reception location;
 the first actuator of the carriage moving one of the protectors in translation in the main direction and forming an opening leading into the trench;
 a portion of the pile flowing through the opening onto the conveyor and the conveyor conveying the divided material forming the portion of the pile;
 moving the carriage to another protector.

BRIEF DESCRIPTION OF THE DRAWINGS

The invention will be better understood from the following description, given by way of example only and made with reference to the appended drawings, of which.

DETAILED DESCRIPTION OF THE PREFERRED EMBODIMENTS

Figure 1:
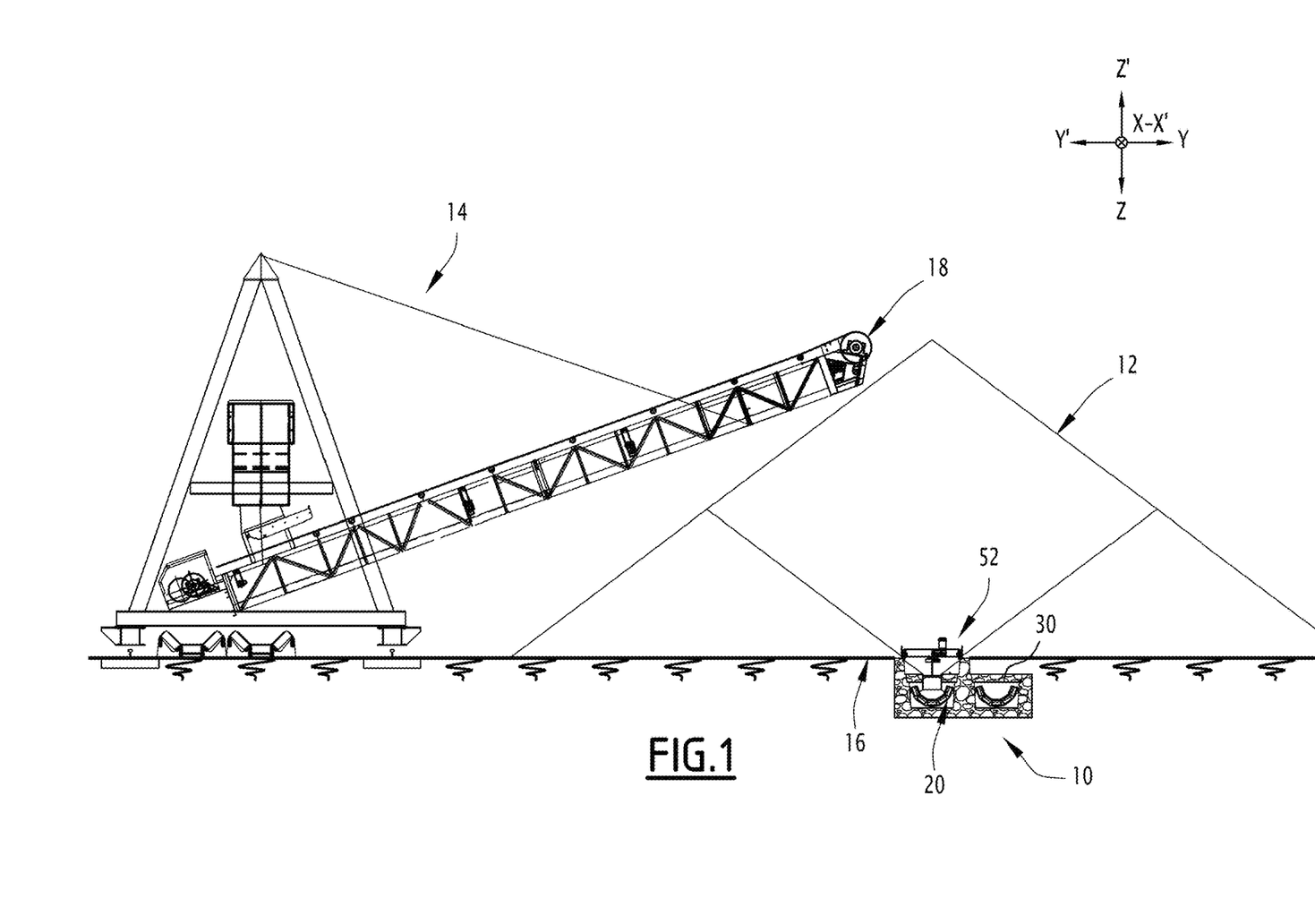
FIG. 1 is a cross-sectional view of a conveying system according to the invention.

FIG. 1 shows a conveying system 10 for conveying a divided material, a pile 12 formed by the divided material intended to be conveyed and a depositing device 14 for the pile 12.

The divided material is ore, mine waste, sand or rubble or salt, for example, or any other type of material.

The reception location 16 comprises a substantially flat surface, located outdoors, for example, or in a shed.

The divided material is deposited on a reception location 16 by the depositing device 14, from a spillway 18 of the depositing device 14.

The material forms the pile 12 at the reception location 16 facing the spillway 18, i.e. a mound of substantially conical shape, the side slope angle of which is determined by the granular flow of the divided material under the effect of gravity.

The conveying system 10 comprises a conveyor 20, i.e. a machine for moving material substantially continuously from a departure point to at least one arrival point.

The conveyor 20 extends along a route that connects a reception portion of reception of the divided material, which extends below the reception location 16 and which constitutes a departure point of the divided material, to at least one arrival point of the divided material.

The conveyor 20 thus defines a main direction X-X' that is local in scope. In the case where the route of the conveyor 20 is substantially straight, the main direction X-X' extends parallel to a line connecting the departure point and the arrival point. A transverse direction Y-Y' and a direction of elevation Z-Z' are also defined, both of which are perpendicular to the main direction X-X', the transverse direction being perpendicular to gravity and the direction of elevation Z-Z' being parallel to gravity.

In the examples shown in FIGS. 1 to 6, the conveyor 20 is a belt conveyor, which comprises a belt 22 and a plurality of belt supports 24, distributed along a conveying route.

The belt 22 is a flat conveyor belt, i.e. a conveyor belt having a flat shape, for example. The belt 22 then extends substantially in a plane parallel to the main X-X' and transverse Y-Y' directions, for example.

According to another embodiment illustrated in the Figures, the belt 22 is a self-supporting conveyor belt, i.e. a conveyor belt having a recessed shape and that retains its shape at rest, in the absence of external constraints other than gravity.

According to this same embodiment, this belt type comprises a matrix, made of an elastic material and a framework, embedded in the matrix. The matrix is typically made of synthetic or natural rubber or PVC.

The framework comprises longitudinal metal cables, for example, or a textile weft made of aramid or any other textile, with an elongation of between 0.2% and 2%. These cables are typically made of steel and have a very low elongation under strain, such as 0.2% to 0.3%. These cables extend over the entire length of the belt 22 and are typically evenly distributed in the section of the belt 22 or over a circumferential portion. In addition to the longitudinal cables or equivalent textile, the framework also comprises transverse metal cables, for example, or a textile weft of aramid or any other textile. These cables are typically made of steel. They typically extend over most of the perimeter of the belt 22. The longitudinal and transverse cables are interwoven with each other in a predetermined weft, for example.

According to this same embodiment, the belt 22 is manufactured in sections, using a vulcanization method, for example. During this operation, each section is shaped around a suitably shaped core and then baked while remaining pressed against the core. The manufacturing process is carried out continuously, with each new section molded and baked in such a way as to constitute an extension of the portion of belt 22 already prepared. The baking is done with the framework embedded in the matrix. The framework is placed in the matrix before or during the shaping operation.

The recessed shape of the belt 22 gives it advantages over a conventional strip. It has a higher loading capacity. Its mechanical strength is increased and its rigidity is heightened, due to the beam effect. The belt 22 is typically closed in a loop at its ends, thanks to turnabout rollers, not shown in the Figures.

The belt 22 thus comprises an outbound strand 26, for transporting the divided material and a return strand 28, parallel to each other and extending in the main direction X-X' of the conveyor 20.

The turnabout rollers are arranged at two opposite longitudinal ends of the conveyor 20, or, in other words, at two ends of the route of the conveyor 20. For example, the conveyor 20 comprises a turnabout roller at each end. The belt 22 is mounted between the two turnaround rollers, for example. As such, the outbound strand 26 and the return strand 28 each extend from one turnaround roller to the other.

The conveyor 20 further comprises a plurality of (non-illustrated) support stations distributed along the route, for example. The belt 22 rests on said support stations.

The conveyor 20 comprises a drive making it possible to move the belt 22 along the route, for example. For example, at least one turnabout roller comprises a drive motor and a drive member for the belt 22. The drive motor is configured to drive the belt 22 in the main direction X-X'. The drive member is rotated by the drive motor. The drive member is in direct contact with the belt 22 so as to cause the belt 22 to move in the longitudinal direction.

The conveying system 10 also comprises a trench 30 defined in the ground, extending at least below the reception location 16, relative to the direction of elevation Z-Z'. The trench 30 receives the conveyor 20, at least on the reception portion of the route. If applicable, the support stations are therefore also received in the trench 30.

In the example shown in the Figures, the trench 30 extends over the entire route of the conveyor 20, and comprises a first portion 32 receiving the outbound strand 26 and a second portion 34 receiving the return strand 28.

In a variant, the trench 30 extends over only a portion of the route of the conveyor 20, comprising the reception portion, with the remainder of the route occurring outside the ground.

The trench 30 is closed by a slab 36, except facing the reception portion where the trench 30 opens to the outside. The slab 36 is a concrete slab in particular, located at mid-height in the trench 30 in the direction of elevation Z-Z'.

In the example shown, the slab 36 is covered with earth to protect it, except at the reception portion, where the slab 36 is uncovered and only partially closes the trench 30.

The slab 36 defines a hole 38 facing the reception portion, intended to allow the flow of the divided material making up the pile 12 towards the belt 22.

The hole 38 extends over at least a portion of the width of the trench 30, and in particular at least a quarter of the width of the trench 30 in the transverse direction Y-Y'.

The hole 38 extends along the entire length of the reception location 16 in the main direction X-X', and is delimited by two end stops on either side.

The hole 38 has lateral edges 40 substantially parallel to each other, provided with a plurality of supports 42.

Advantageously, the supports 42 are substantially cylindrical irons, partially embedded in the slab 36 and projecting in the transverse direction Y-Y' from each of the side edges 40 and extending partially across the hole 38. The rounded shape of the supports 42 facilitates sliding on the supports 42 along the trench 30 in the main direction X-X'.

The supports 42 are distributed substantially symmetrically on each of the side edges 40.

Advantageously, the trench 30 has upper edges 44 that border the trench 30 at ground level, provided with rails 46 suitable for the circulation of wheeled rail vehicles.

The rails 46 extend parallel to each other, in the main direction X-X', at least over the entire extent of the reception portion.

The conveying system 10 further comprises a plurality of protectors 50 arranged across the hole 38 of the trench 30, and a carriage 52 adapted to move along the trench 30 on the rails 46, and to move the protectors 50. The protectors can also be called helmets.

The protectors 50 are arranged in line in the main direction X-X', across the hole 38, resting on the supports 42.

Each protector 50 comprises a horizontal plate 54, adapted to be arranged across the hole 38 resting on the supports 42, and a vertical plate 56, projecting from the middle of the horizontal plate 54 and extending perpendicular to the horizontal plate 54.

The horizontal plate 54 extends in a plane orthogonal to the direction of elevation Z-Z' and the vertical plate 56 in a plane orthogonal to the transverse direction Y-Y'. Each protector 50 has an inverted T-shaped cross-section in a plane orthogonal to the main direction X-X'.

The horizontal plate 54 and the vertical plate 56 are substantially rectangular metal plates, attached to each other by longitudinal welding of a lower edge of the vertical plate 56 along an axis of symmetry of the horizontal plate 54, for example, or by bolting.

Figure 2:
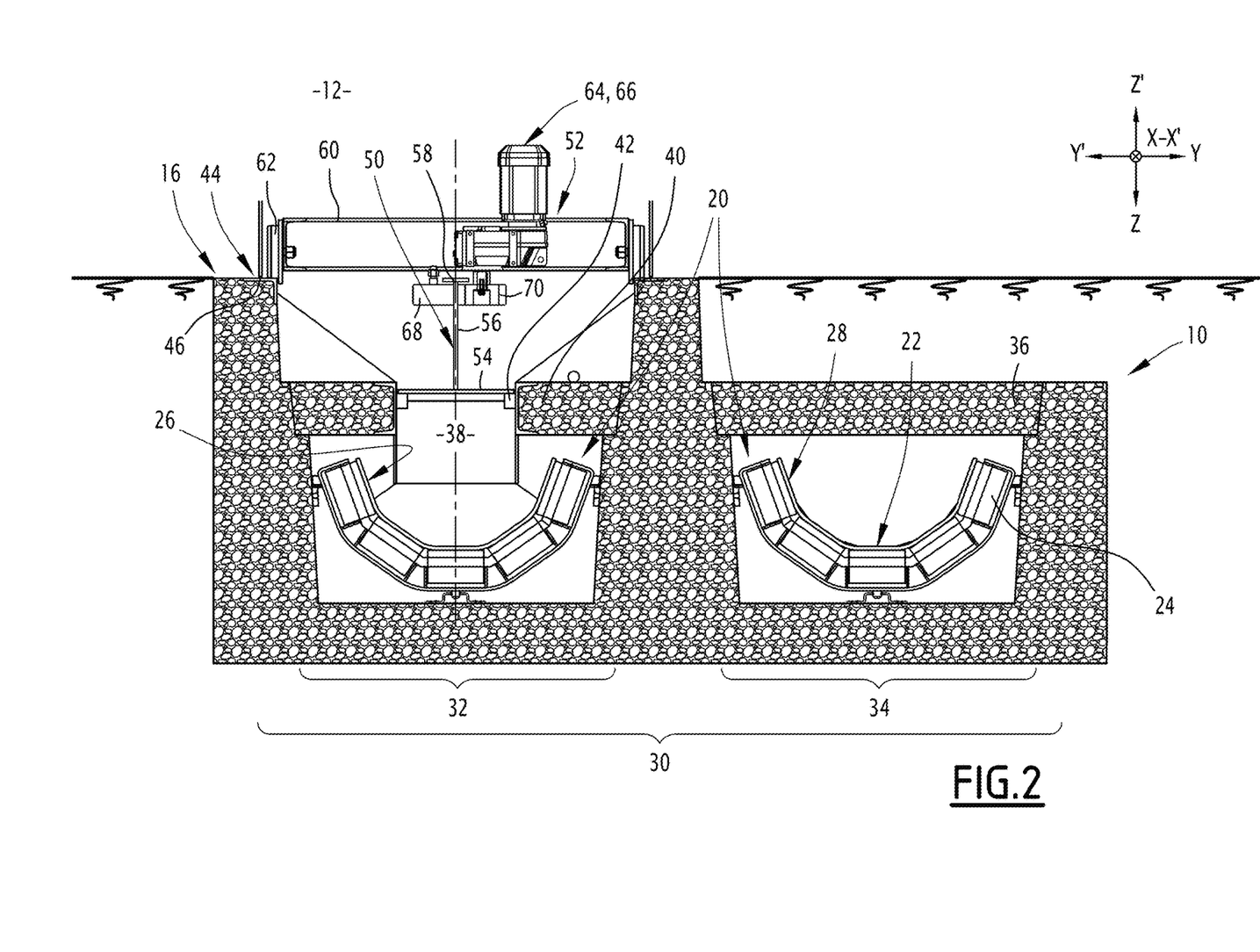
FIG. 2 is a detailed view of the conveying system of FIG. 1.
Figure 3:
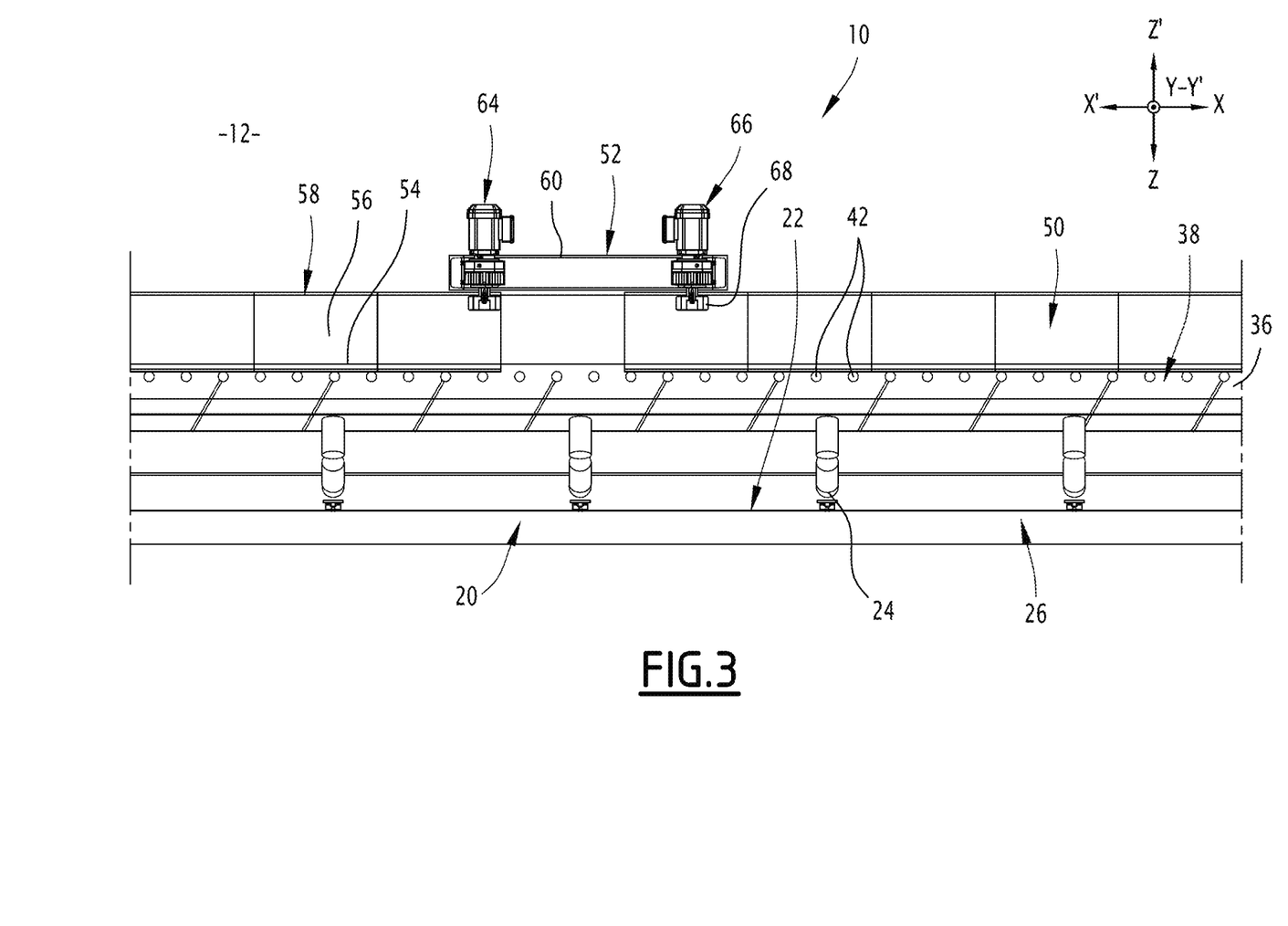
FIG. 3 is a longitudinal cross-sectional view of the conveying system of FIGS. 1 and 2.

Advantageously, as shown in FIG. 2, an upper edge 58 of the vertical plate 56 has a shoulder projecting from both sides of the vertical plate 56 along the transverse direction Y-Y', in order to improve the grip of the protector 50.

Figure 6:
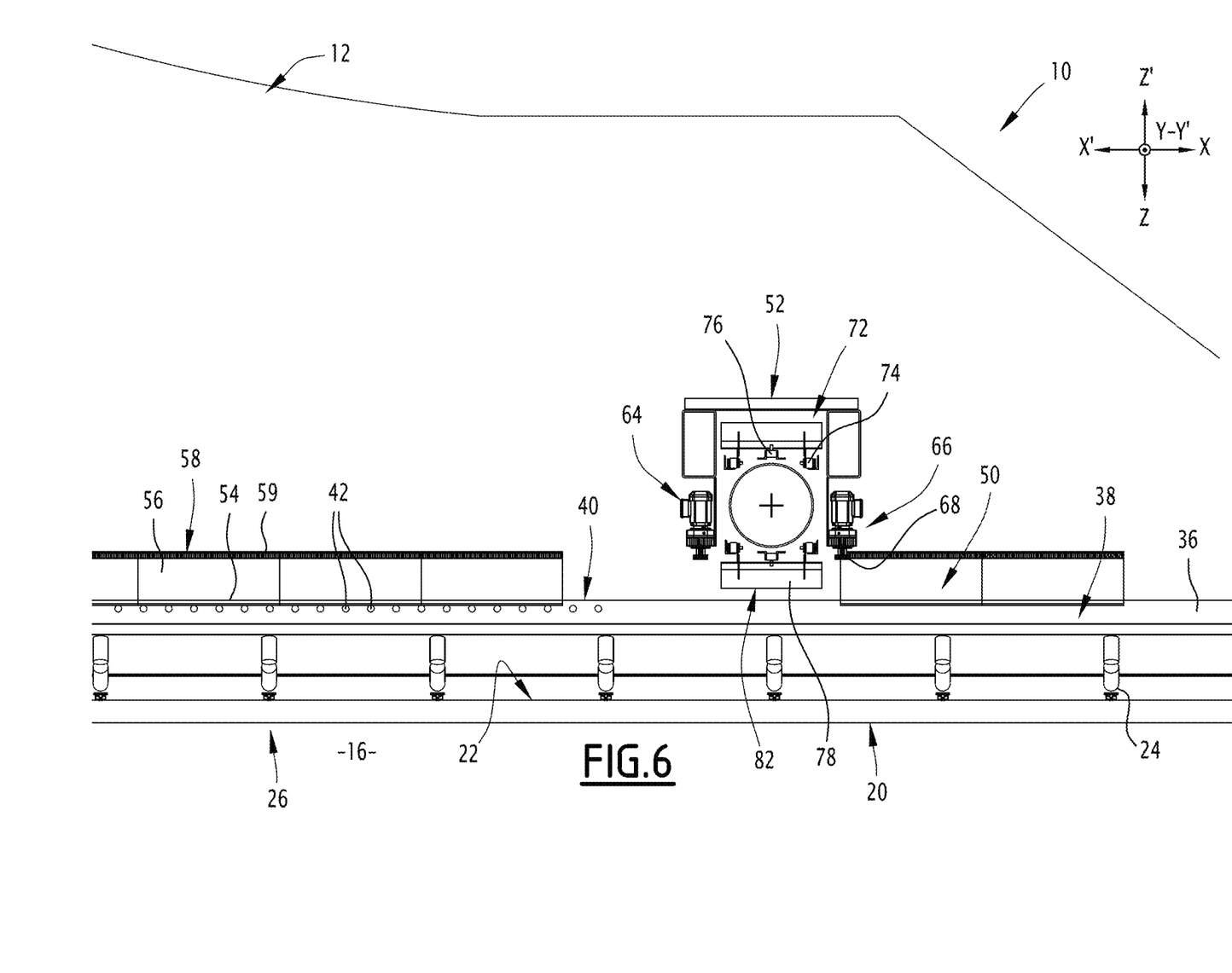
FIG. 6 is a longitudinal cross-sectional view of the conveying system of FIG. 5.

Advantageously, as shown in FIG. 6, the vertical plate 56 has treads 59 extending below the upper edge 58, on each face of the vertical plate 56, and having reliefs for better contact on the vertical plate 56.

In a variant, the tread 59 is a rack, and the reliefs are teeth suitable for interaction with a gear wheel.

In a variant, the vertical plate 56 is not rectangular, but has any shape comprising the upper edge 58, such as a T-shape in a plane orthogonal to the transverse direction Y-Y'.

The carriage 52 comprises a chassis 60 and wheels 62 for travel on the rails 46, as well as a first actuator 64 arranged to move the protectors 50 and a second actuator 66 arranged to move the carriage 52 along the rails 46.

Figure 4:
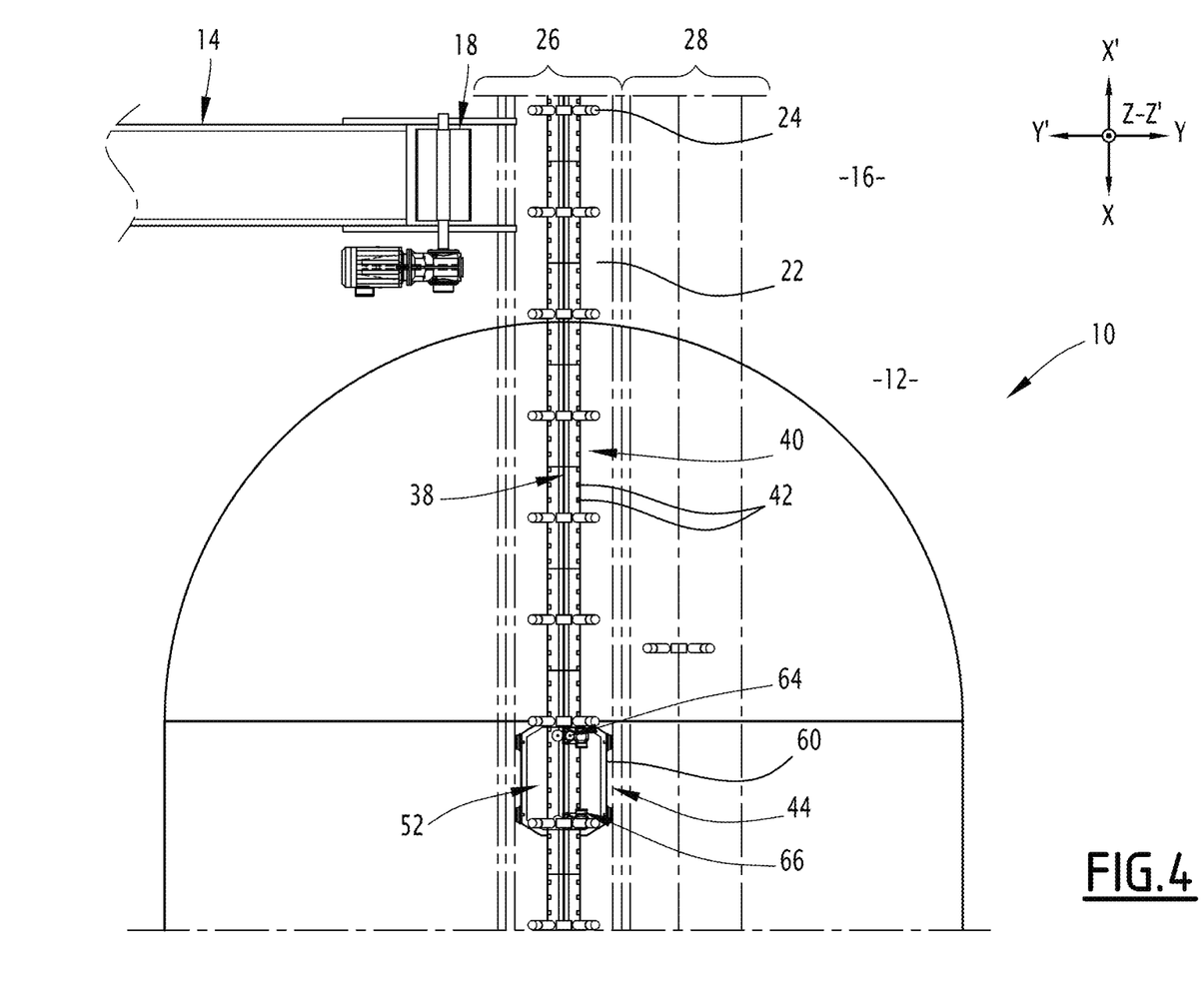
FIG. 4 is a top view of the conveying system of FIGS. 1 to 3.

The chassis 60 has, as shown in FIG. 4, a substantially hexagonal shape in a horizontal median plane parallel to the main direction X-X' and the transverse direction Y-Y', open above the trench 30 along the direction of elevation Z-Z'.

In a variant, the chassis 60 has a substantially rectangular shape in the horizontal median plane.

The first actuator 64 and the second actuator 66 are attached to the chassis 60, at two opposite ends of the chassis 60 in the main direction X-X'. The first actuator 64, suitable for moving the protectors 50, is located at the front end of the chassis 60 and the second actuator 66, suitable for moving the carriage 52, is located at the rear end of the chassis 60, according to the direction of movement of the carriage 52 in the direction of the pile 12.

Advantageously, the first actuator 64 and the second actuator 66 are substantially identical to each other, and their roles of moving the protectors 50 and the carriage 52, respectively, can be reversed by changing the direction of travel of the rails 46 by the carriage 52.

The first actuator 64 and the second actuator 66 each comprise at least one motor, in particular an electric motor, as well as a roller 68 and a counter-roller 70 which are rotatable about respective axes of rotation parallel to the direction of elevation Z-Z'.

According to the embodiment shown in the Figures, each of the first actuator 64 and the second actuator 66 comprises a single motor suitable for rotating the roller 68, and the counter-roller 70 is mounted so as to be freely rotatable.

According to a second embodiment, each of the first actuator 64 and the second actuator 66 comprises two motors, suitable for rotating the respective roller 68 and counter-roller 70, in opposite directions of rotation.

The roller 68 and the counter-roller 70 are arranged to come into contact with two opposite faces of the vertical plate 56 of one of the protectors 50, and to move the protector 50 with respect to the carriage 52 or the carriage 52 with respect to the protector 50, in translation in the main direction X-X'.

The roller 68 and the counter-roller 70 have a substantially cylindrical shape with an axis substantially parallel to the direction of elevation, and define a peripheral rolling surface.

The rollers 68 and counter-roller 70 are rotatably mounted with respect to the chassis 60 of the carriage 52, and extend below the horizontal median plane of the chassis 60 in the direction of elevation.

The roller 68 and the counter-roller 70 lie on either side of a vertical median plane of the chassis 60, parallel to the main direction X-X' and the direction of elevation Z-Z', so that their rolling surfaces extend opposite each other and opposite the vertical median plane.

The distance separating the rolling surfaces of the roller 68 and the counter-roller 70 measured along the transverse direction Y-Y' is substantially equal to a thickness of the vertical plate 56 of the protectors 50 in the vicinity of the upper edge 58.

Advantageously, the rolling surfaces of the roller 68 and counter-roller 70 have reliefs, improving the adhesion of the rolling surfaces to the vertical plates 56 of the protectors 50, and, in particular, to the treads extending on the vertical plates 56.

In a variant, in the case where the tread is a rack, the rolling surfaces have teeth and the roller 68 and counter-roller 70 constitute cogwheels that interact with the rack.

Figure 5:
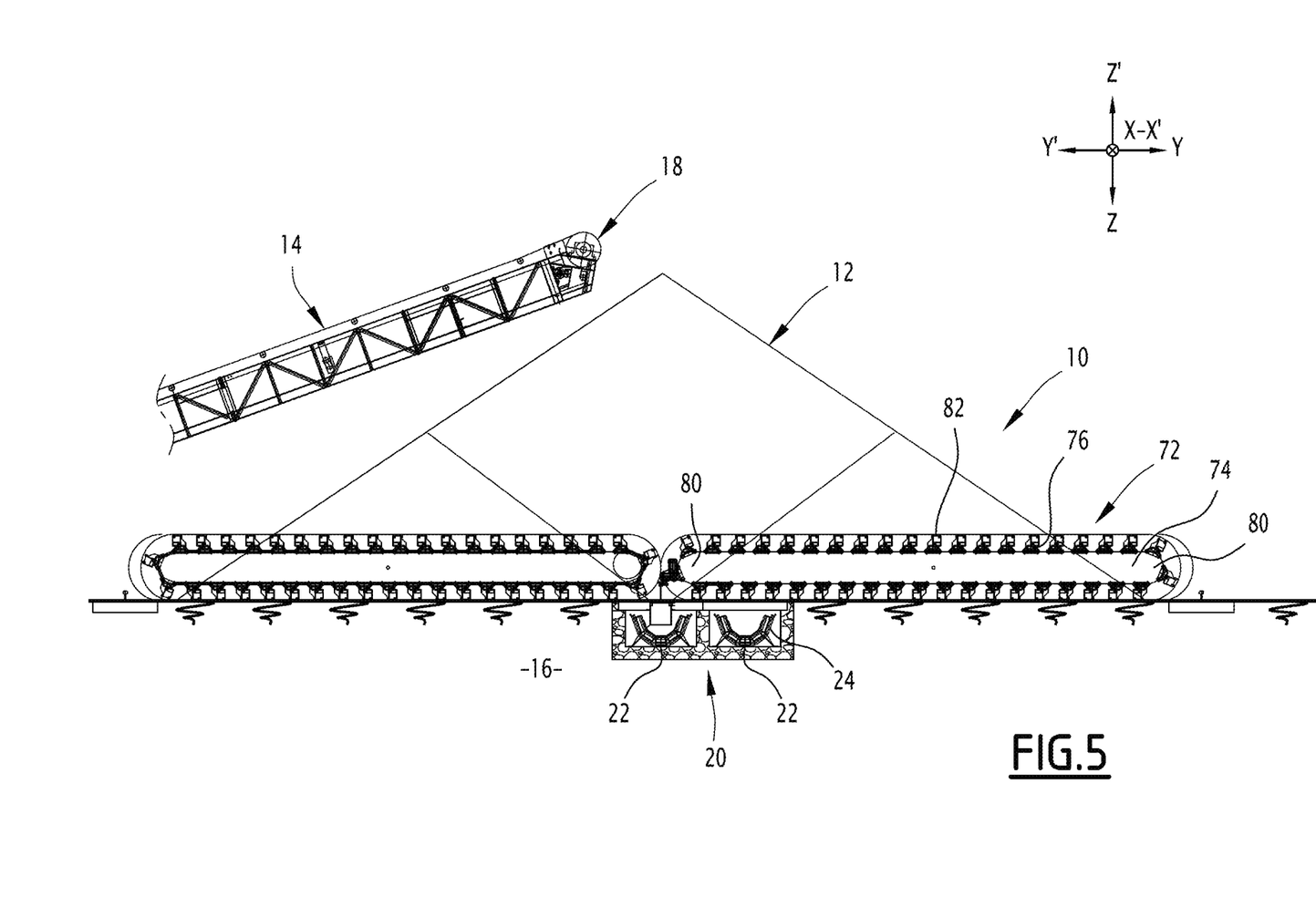
FIG. 5 is a cross-sectional view of a conveying system according to another embodiment of the invention.

According to one embodiment shown in FIGS. 5 and 6, the carriage 52 comprises two scraping devices 72 attached to the chassis 60 and extending on either side of the chassis 60 in the transverse direction Y-Y.

Each scraping device 72 comprises a frame 74 attached to the chassis 60 of the carriage 52 and extending in the transverse direction Y-Y', a chain 76 movably mounted along the frame 74 and carrying a plurality of brushes 78, and a motor for driving the chain 76.

The chain 76 loops around at least two support pulleys 80 located at a respective proximal and distal end of the frame 74, and is driven around the pulleys 80 by the drive motor.

The brushes 78 are attached to the chain at substantially regular intervals and are adapted to drive the divided material along the ground toward the trench 30. The movement of the chain drives the brushes 78 back and forth along the frame 74, with the route toward the trench 30 extending below the frame 74, and the return route extending above the frame 74.

Each brush 78 comprises a scraping edge 82, for example, extending substantially in the main direction X-X', arranged to come within the vicinity of the ground and to drag the divided material during the movement of the brush 78 towards the trench 30.

In a variant, each brush 78 comprises a mop adapted to engage the ground frictionally and drag the divided material during the movement of the brush 78 toward the trench 30.

The use of the scraping devices 72 makes it possible to drag the divided material toward the opening over a wider extent, along the transverse direction Y-Y'.

Advantageously, the carriage 52 comprises an automated control module, capable of activating the first actuator 64 and the second actuator 66 to move the carriage 52 and the protectors 50, to implement a conveying method described below.

A method for conveying divided material that implements the conveying system 10 described above, will now be described.

The method comprises a preliminary step of depositing the divided material on the reception location 16 so as to form a pile 12, at least partially above the trench 30. In the example shown in FIGS. 1 through 6, the pile 12 has a substantially conical initial shape.

The belt 22 of the conveyor 20 is in constant motion along its route throughout the conveying method. For example, the drive motor for at least one turnabout roller drives the belt 22 in the main direction X-X'.

The hole 38 of the trench 30 is closed by a row of protectors 50, aligned in edge-to-edge contact in the main direction X-X'.

The carriage 52 is moved on the rails 46, to a starting position in the vicinity of one of the side edges of the pile 12. The carriage 52 in the starting position is above an initial opening formed between a first protector 50 and an end stop of the trench 30 or one or more other protectors 50 bearing against the end stop.

The vertical plate 56 of the first protector 50 is engaged in contact between the roller 68 and the counter-roller 70 of the first actuator 64, located at the front end of the carriage 52.

The first protector 50 is located forward of the carriage 52 on the route toward the pile 12, in the main direction X-X'.

The method then comprises a step of moving the first protector 50 to form an opening.

The first actuator 64 is activated, moving the first protector 50 by driving between the roller 68 and the counter-roller 70 that rotate in opposite directions. The first protector 50 is moved in the main direction X-X' toward the end stop.

The movement of the first protector 50 forms an opening between the first protector 50 and a following protector 50, called the second protector 50, in alignment with the pile 12, opening into the trench 30 above the conveyor 20.

The first protector 50 is moved along the entire length of the initial opening until contact is made with the end stop or protectors 50 bearing against the stop. At the end of the movement of the first protector 50, the vertical plate 56 of the first protector 50 is engaged between the roller 68 and the counter-roller 70 of the second actuator 66.

A portion of the divided material comprising the pile 12 flows through the opening to the conveyor 20, and is received on the belt 22. The belt 22 moves continuously along its route, driving the received divided material as it flows.

The flow of a portion of the divided material clears a space forming a slope in the pile 12, having a substantially inverted conical shape, with the apex of the cone in the vicinity of the opening and the slopes, depending on the granular flow characteristics of the material.

Once all the divided material occupying the vacated space has flowed, the flow of divided material through the opening stops.

The second carriage actuator 52 is then activated, moving the carriage 52 in the main direction X-X' into the vacated space. The carriage 52 is moved by rotation of the roller 68 and counter-roller 70 against the vertical plate 56 of the first protector 50, with the first protector 50 leaning against the stop or against protectors 50 leaning against the stop.

The carriage 52 is moved over the length of the first protector 50, until the roller 68 and counter-roller 70 of the second actuator 66 are no longer in contact with the first protector 50. At the end of the movement of the carriage 52, the vertical plate 56 of the second protector 50 is engaged between the roller 68 and the counter-roller 70 of the first actuator 64.

The method then comprises a step of moving the second protector 50, to move the opening.

The step of moving the second protector 50 is identical to the step of moving the first protector 50 described above, with the second protector 50 acting as the first protector 50, and a protector 50 following the second protector 50, called the third protector 50, in alignment with the stack 12, acting as the second protector 50. The first protector 50 is added to the protectors 50 leaning against the object.

The method comprises iteration of successive steps of moving protectors 50 and moving the opening from one to the other. Each movement of the opening causes a portion of the material forming the pile 12 to flow out, located in a conical space whose point is at the opening.

As such, as the carriage 52 and the opening move in the main direction X-X', the divided material forming the pile 12 flows into the trench 30 and is conveyed by the conveyor 20.

Advantageously, the method can be automated.

The conveying system 10 and related method described above allow the pile 12 of divided material to be discharged in a simple and efficient manner, by progressively passing it onto the belt 22.

This conveying system 10 does not comprise any equipment that is complex to size, such as hoppers or silos, but only a reception location 16 and a trench 30, the dimensions of which are substantially independent of the divided material and the quantities used.

In addition, protectors 50 are robust and easy to repair or replace in case of wear. The failure of one protector 50 does not jeopardize the entire system, unlike systems with fixed storage enclosures.

In addition, the method is easily automated, requiring little labor or external intervention.

What is claimed is:

1. A conveying system for conveying divided material forming a pile, the conveying system comprising:
   a trench extending along a main direction, under a reception location of the pile along a direction of elevation; and
   a conveyor extending along a route, the route comprising at least one reception portion extending into the trench;
   wherein the conveying system further comprises:
   a plurality of protection elements extending across the trench, above the reception portion along the direction of elevation; and
   a carriage adapted to move along the trench and comprising a first actuator adapted to move each protection element of the plurality of protection elements successively in translation in the main direction,
   wherein the trench is located under the ground,
   wherein the plurality of protection elements is arranged in line in the main direction,
   wherein the plurality of protection elements is arranged across a hole of the trench, closing the hole on all its longitudinal length except for an opening, the plurality of protection elements being movable longitudinally along the hole to make a position of the opening along the hole vary.

2. The conveying system according to claim 1, wherein each protection element comprises:
   a substantially rectangular horizontal plate extending across the trench, and
   a vertical plate attached to the horizontal plate, projecting perpendicularly from the horizontal plate along the direction of elevation.

3. The conveying system according to claim 2, wherein the first actuator comprises a roller and a counter-roller rotatable about respective axes of rotation parallel to the direction of elevation, the first actuator also comprising a motor arranged to rotate at least the roller, the roller and the counter-roller being arranged to come into contact with two opposite faces of the vertical plate and to move the protection element in translation in the main direction.

4. The conveying system according to claim 3, wherein the carriage comprises side plates extending opposite the rollers and counter-rollers, intended to protect the rollers from the divided material.

5. The conveying system according to claim 2, wherein the carriage comprises a second actuator comprising a second roller and a second counter-roller, as well as a motor rotating at least the second roller, the second roller and second counter-roller being arranged to come into contact with two opposite faces of the vertical plate and to move the carriage in translation in the main direction.

6. The conveying system according to claim 1, wherein the carriage comprises at least one scraping device extending in a transverse direction orthogonal to the main direction, each scraping device comprising at least one brush mounted on a chain movable in the transverse direction, so as to move the divided material from the pile towards the trench in the transverse direction.

7. The conveying system according to claim 1, wherein the trench defines substantially parallel side edges, the conveying system comprising supports projecting from the side edges of the trench and supporting the protection elements.

8. The conveying system according to claim 7, wherein the supports are substantially cylindrical and have a substantially circular cross-section in a plane parallel to the main direction and to the direction of elevation.

9. The conveying system according to claim 1, wherein the conveyor comprises a conveyor belt extending substantially parallel to the main direction and forming an outbound strand extending into the reception portion, and a return strand.

10. A method for conveying a divided material, the method comprising:
    providing a conveying system according to claim 1, and a pile formed by the divided material on the reception location;
    the first actuator of the carriage moving one of the protection elements in translation in the main direction by forming an opening leading into the trench;
    a portion of the pile flowing through the opening onto the conveyor and the conveyor conveying the divided material forming the portion of the pile;
    moving the carriage to another protection element.

11. The conveying system according to claim 1, wherein the trench is closed by a slab, except facing the reception portion where the trench defines a hole intended to allow the flow of the divided material making up the pile towards a belt.

12. The conveying system according to claim 11, wherein the plurality of protection elements is arranged across the hole of the trench, closing the hole on all its longitudinal length except for an opening, the plurality of protection elements being movable longitudinally along the hole to make the position of the opening along the hole vary.

13. A conveying system for conveying divided material forming a pile, the conveying system comprising:
    a trench extending along a main direction, under a reception location of the pile along a direction of elevation; and
    a conveyor extending along a route, the route comprising at least one reception portion extending into the trench;
    wherein the conveying system further comprises:
    a plurality of protection elements extending across the trench, above the reception portion along the direction of elevation; and
    a carriage adapted to move along the trench and comprising a first actuator adapted to move each protection element of the plurality of protection elements successively in translation in the main direction,
    wherein the trench is located under the ground,
    wherein the first actuator comprises:
    a roller and a counter-roller rotatable about respective axes of a rotation parallel to the direction of elevation;
    a motor arranged to rotate at least the roller,
    wherein the roller and the counter-roller are arranged to come into contact with two opposite faces of a vertical plate of said each protection element and to move said each protection element in translation in the main direction.

14. A conveying system for conveying divided material forming a pile, the conveying system comprising:
    a trench extending along a main direction, under a reception location of the pile along a direction of elevation; and
    a conveyor extending along a route, the route comprising at least one reception portion extending into the trench;
    wherein the conveying system further comprises:
    a plurality of protection elements extending across the trench, above the reception portion along the direction of elevation; and
    a carriage adapted to move along the trench and comprising a first actuator adapted to move each protection element of the plurality of protection elements successively in translation in the main direction,
wherein the trench is located under the ground,
wherein the carriage comprises at least one scraping device extending in a transverse direction orthogonal to the main direction, each scraping device comprising at least one brush mounted on a chain movable in the transverse direction so as to move the divided material from the pile towards the trench in the transverse direction.

* * * * *